United States Patent [19]

Huang

[11] Patent Number: 4,722,198
[45] Date of Patent: Feb. 2, 1988

[54] SLUSH OR ICE CREAM MAKER

[76] Inventor: Cheng F. Huang, 2F., No. 22, Lane 20, Sec. 2, Chungshan N. Rd., Taipei, Taiwan

[21] Appl. No.: 3,078

[22] Filed: Jan. 14, 1987

[51] Int. Cl.⁴ .............................................. A23G 9/16
[52] U.S. Cl. ........................................ 62/342; 62/136; 366/233; 188/82.34; 188/82.7; 192/150; 403/2
[58] Field of Search .................. 62/342, 136, 343; 366/220, 233; 188/82.34, 82.7, 84; 403/2; 192/150

[56] References Cited

U.S. PATENT DOCUMENTS

| Re. 25,859 | 9/1965 | Thomas | 62/136 |
|---|---|---|---|
| 1,638,999 | 6/1927 | Chandler | 366/233 X |
| 2,541,814 | 2/1951 | Gaddini | 62/136 |
| 2,599,021 | 6/1952 | Sebastian | 62/343 X |
| 2,993,350 | 7/1961 | Smith | 62/342 |
| 3,108,449 | 10/1963 | Lents | 62/136 X |
| 3,188,826 | 6/1965 | Cappigiani | 62/136 |
| 3,942,769 | 3/1976 | Whiteside et al. | 366/233 X |

Primary Examiner—William E. Tapolcai
Attorney, Agent, or Firm—Poms, Smith, Lande & Rose

[57] ABSTRACT

A machine suitable for placement in a freezer for making slush or ice cream in a cylindrical container. The machine comprises a platform which is lengthwise adjustable, at least four rollers which have an adjustable distance support container, a driving means to drive the rollers and rotate the container, a scraping means disposed on the shaft of the container to scrape freezing slush or ice cream and to be used as a second safety means, and a first safety means which comprises a base plate, a control plate and a flexible element engaged together. When the slush or ice cream is hard enough, the control plate and the flexible element will rotate respective to the base plate so that the shaft will rotate together with the container. Further, even if the first safety means is out of order, the scraping means will free from the shaft of the container, then the scraping means will rotate together with the container in order to be used as a second safety means.

2 Claims, 12 Drawing Figures

FIG.2

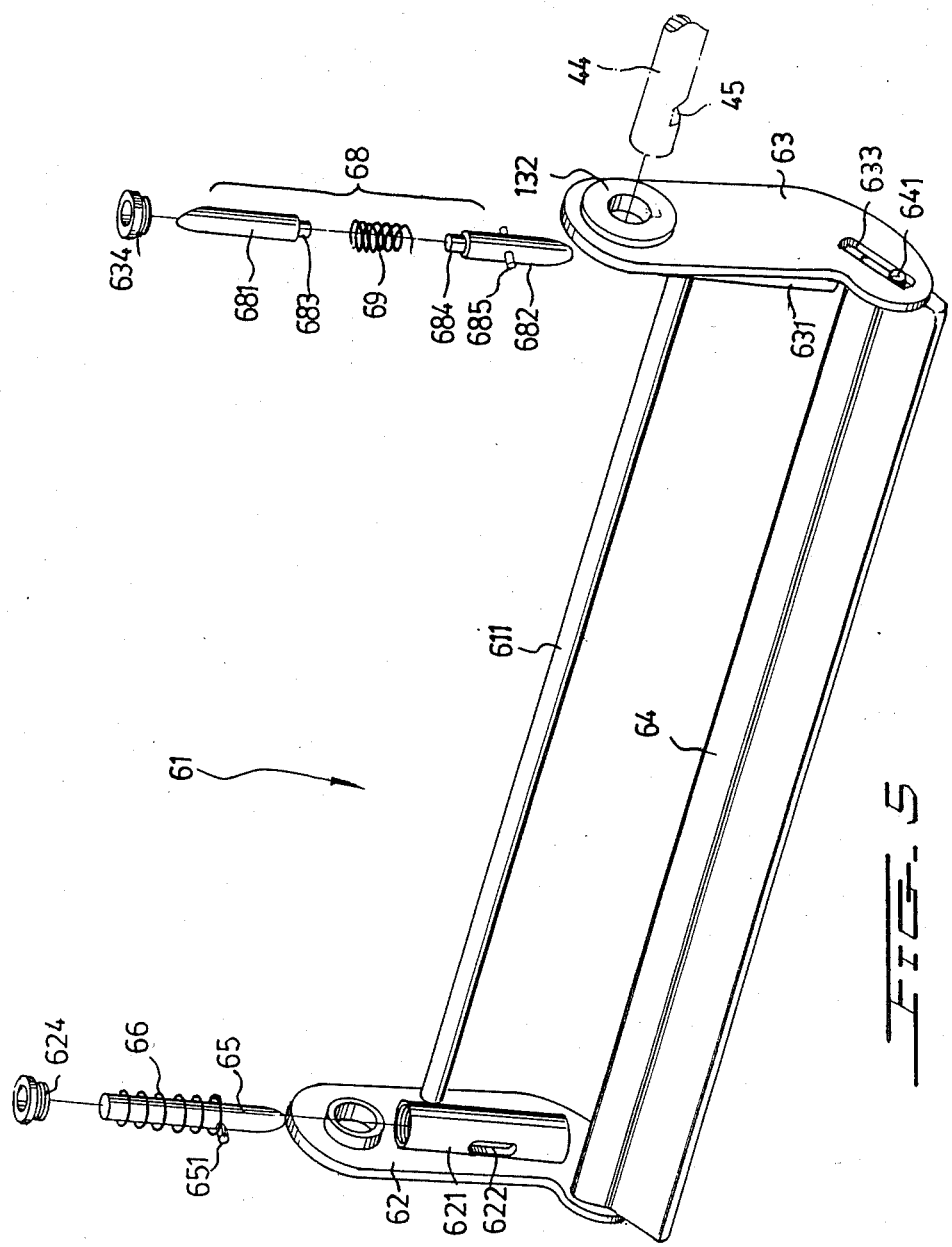

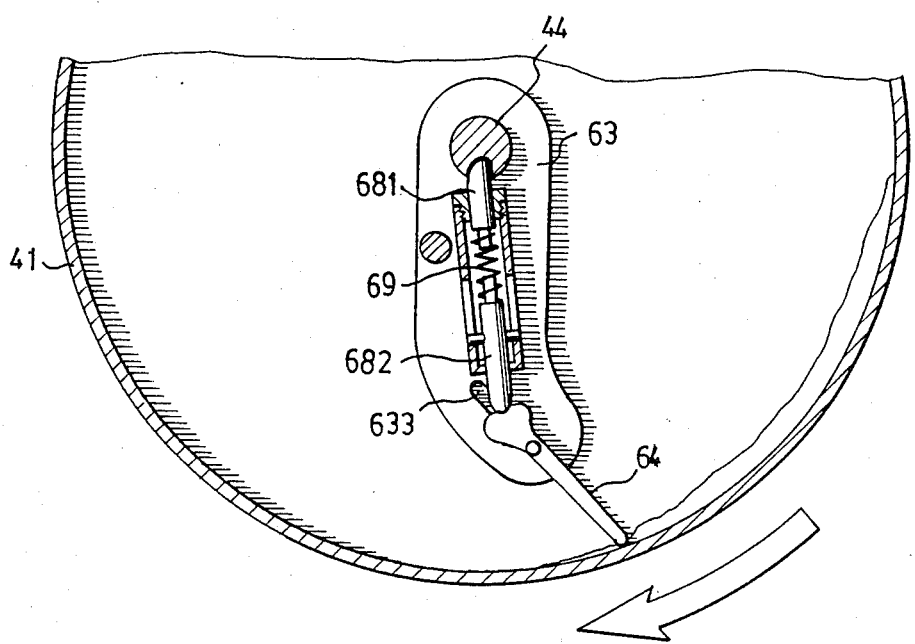
FIG. 6-A

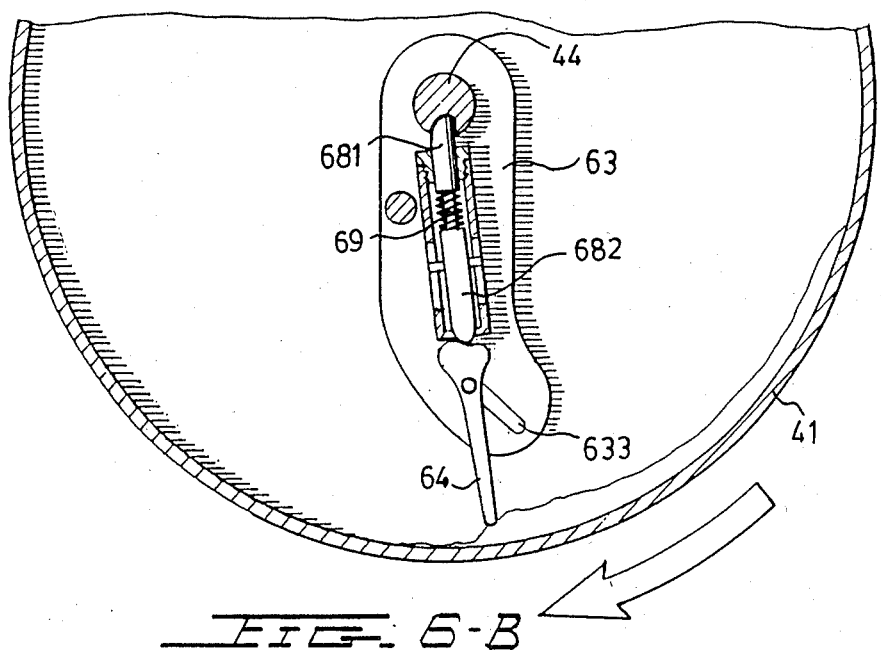
FIG. 6-B
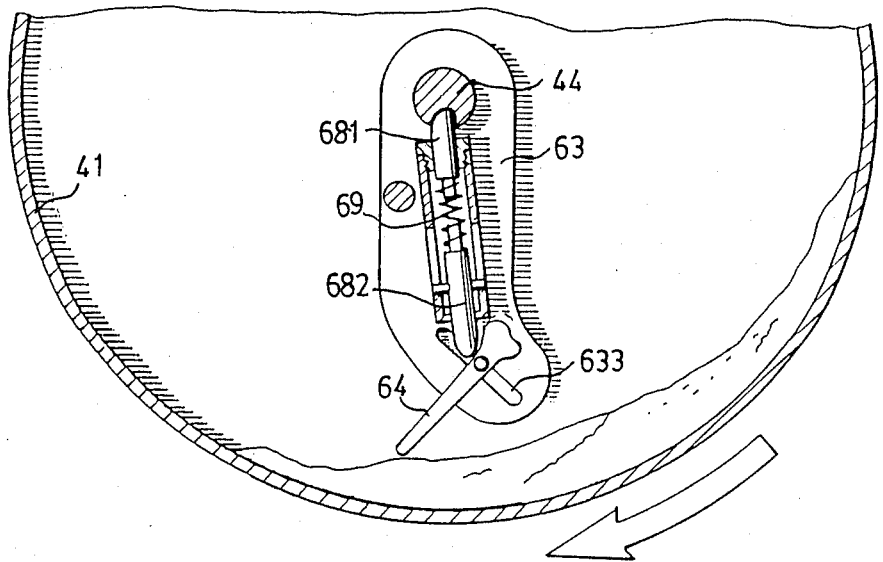
FIG. 6-C

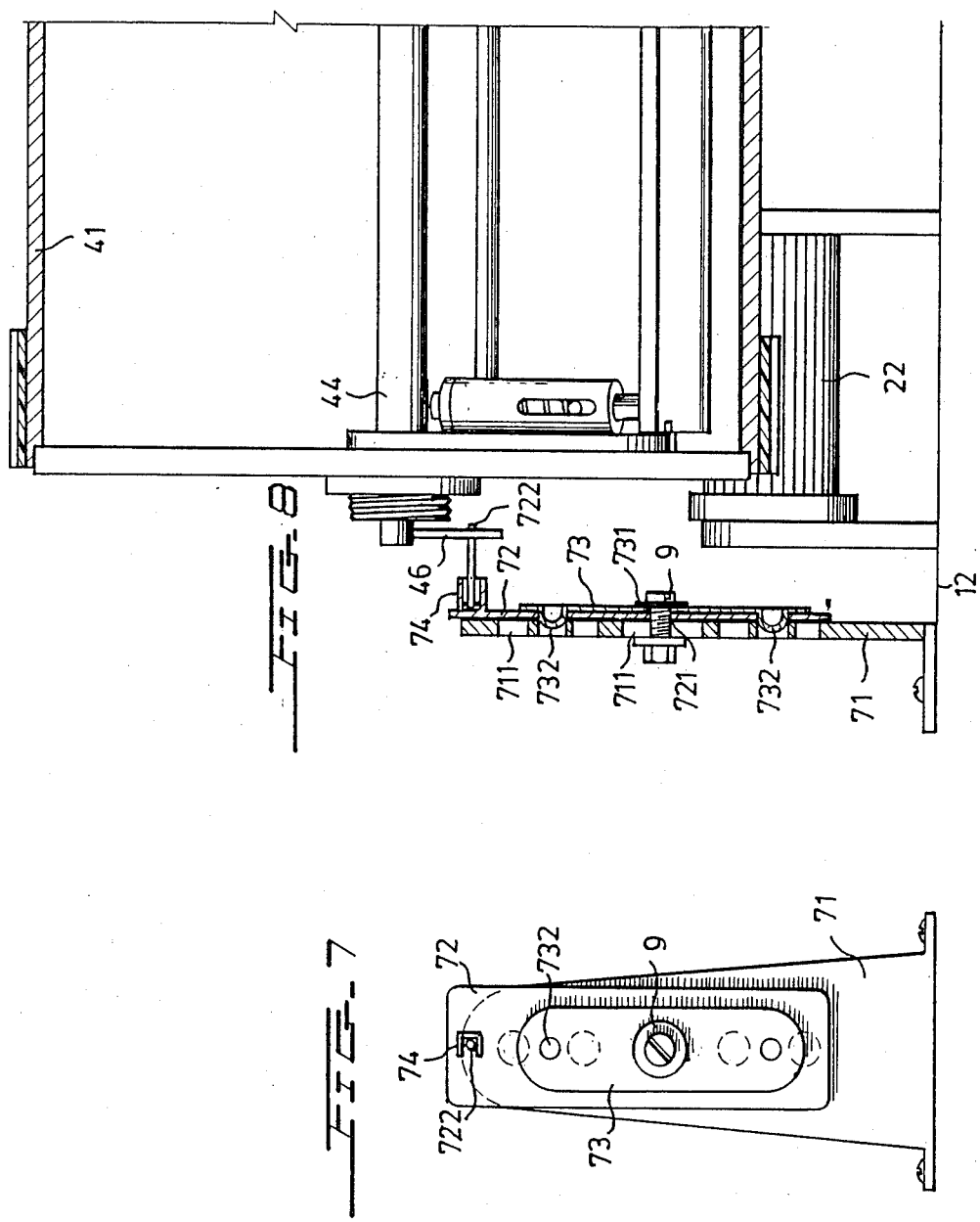

SLUSH OR ICE CREAM MAKER

BACKGROUND OF THE INVENTION

This invention relates to a machine which is used for making slush or ice cream in a freezer, especially in a refrigerator freezer.

Hand cranked ice cream freezers have been known for many years. They usually comprise a metal container in which the ice cream mix is contained, a surrounding vessel holding a freezing mixture (usually ice mixed with salt), "paddles" for stirring the mix, and drive means for the paddles, usually comprising a crank handle and gear train. Laborious hand turning and the need for inconvenient freezing mixtures are the major drawbacks.

Ice cream makers with power driven paddles are known. However, the power requirements are significant. As the ice cream mix progressively freezes, it become increasingly difficult to rotate the paddles in the ice cream. When the freezing process is near completion, rotation is very difficult if not impossible. Where the paddles are motor driven, a relatively powerful motor is required. A clutch was often used to prevent overloading to motor. Such items considerably add to the cost of the machine.

U.S. Pat. No. 2,993,350 to Smith discloses an ice cream maker for use in a refrigerator freezer. A cylindrical container with a stirring blade on its inside wall is rotated about its longitudinal axis. The container contains the ice cream mix. The motor is directly engaged to the container via a gear train. However, to fit the drive mechanism, the container has to be custom made. The dimensions of the container are also fixed. Also, the drive unit has a drive shaft which extends through the wall of the modified container to accomodate the ice cream maker.

What is needed is a machine that employs a new way of agitating the ice cream mix whereby rotating paddle and the like are obviated. The power requirement for agitating the ice cream should be low. Preferably common household containers of various dimensions can be used in place of expensive custom made containers. Safety is of the utmost concern because the machine can be used in the house, where there may be children who may tamper with the machine. The machine should be inexpensive, and its use in the refrigerator should require no modification of the refrigerator.

U.S. patent application Ser. No. 822,377, now U.S. Pat. No. 4,669,274, (which was filed by the inventor of the present invention) has been met the above needs to be used for making slush or ice cream in a freezer. The present invention further provides safety means which prevent the relative movement between the paddle and container when the slush or ice cream has been well formed.

SUMMARY OF THE INVENTION

It is the primary objective of the present invention to provide a machine which is suitable for placement in a freezer for making slush or ice cream in a cylindrical container.

It is another objective of the present invention to provide a slush or ice cream maker which comprises first safety means and second safety means to allow the paddle to rotate in the container when the slush or ice cream has been formed.

Further objectives and advantages of the present invention will become apparent as the following description proceeds, and the features of novelty which characterize the invention are pointed out with particularity in the claims annexed to the forming a part of this invention.

BRIEF DESCRIPTION OF THE DRAWINGS

FIG. 2 is a top view of the present invention in which the container is removed;

FIG. 5 is an exploded view of the paddle and the second safety means which is mounted on the shaft of the container;

FIG. 6A–6C show the scraping plate to be turned a certain angle;

FIG. 7 is a side view of the first safety means of the present invention;

FIG. 8 shows the first safety means contacting with the rod of the shaft of the container in order to stabilize the shaft;

DETAILED DESCRIPTION OF THE INVENTION

Figure 1:
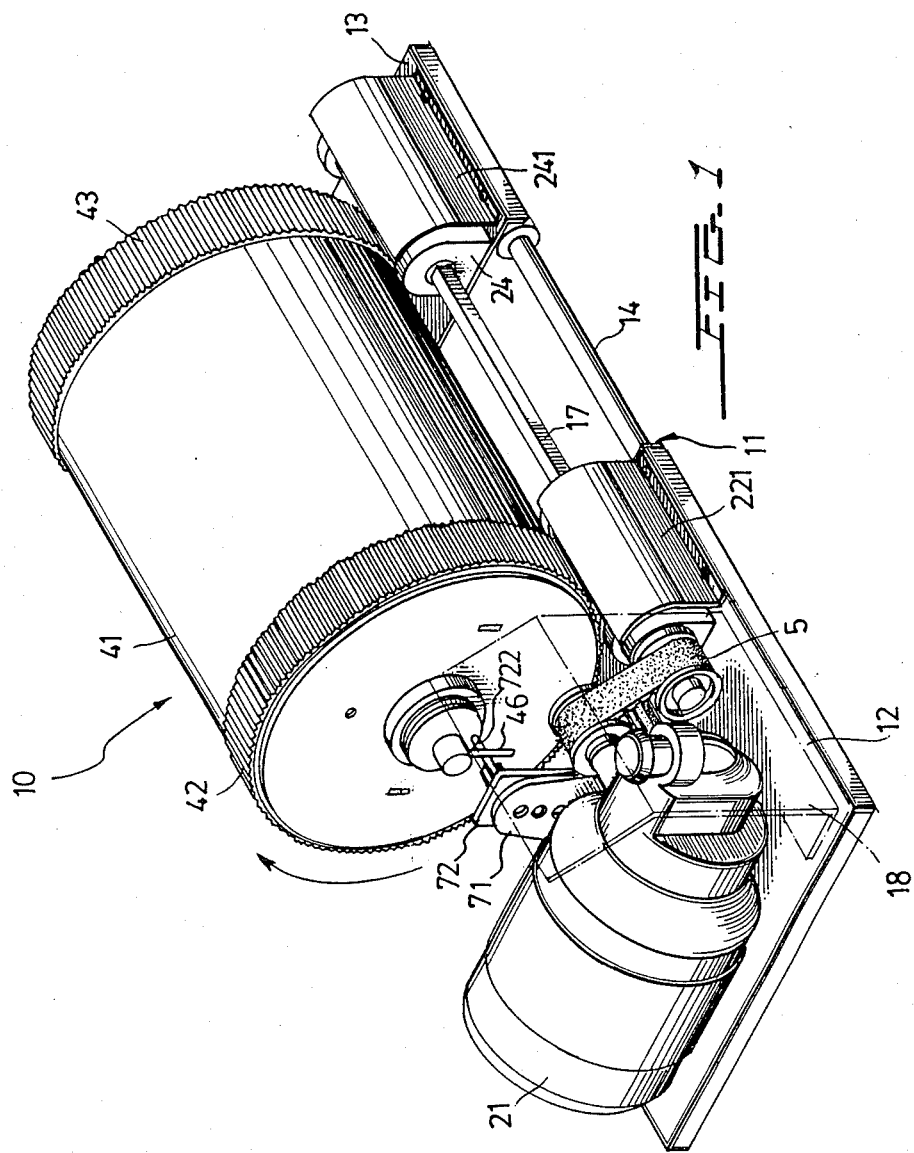
FIG. 1 is a perspective view of the present invention.
Figure 2:
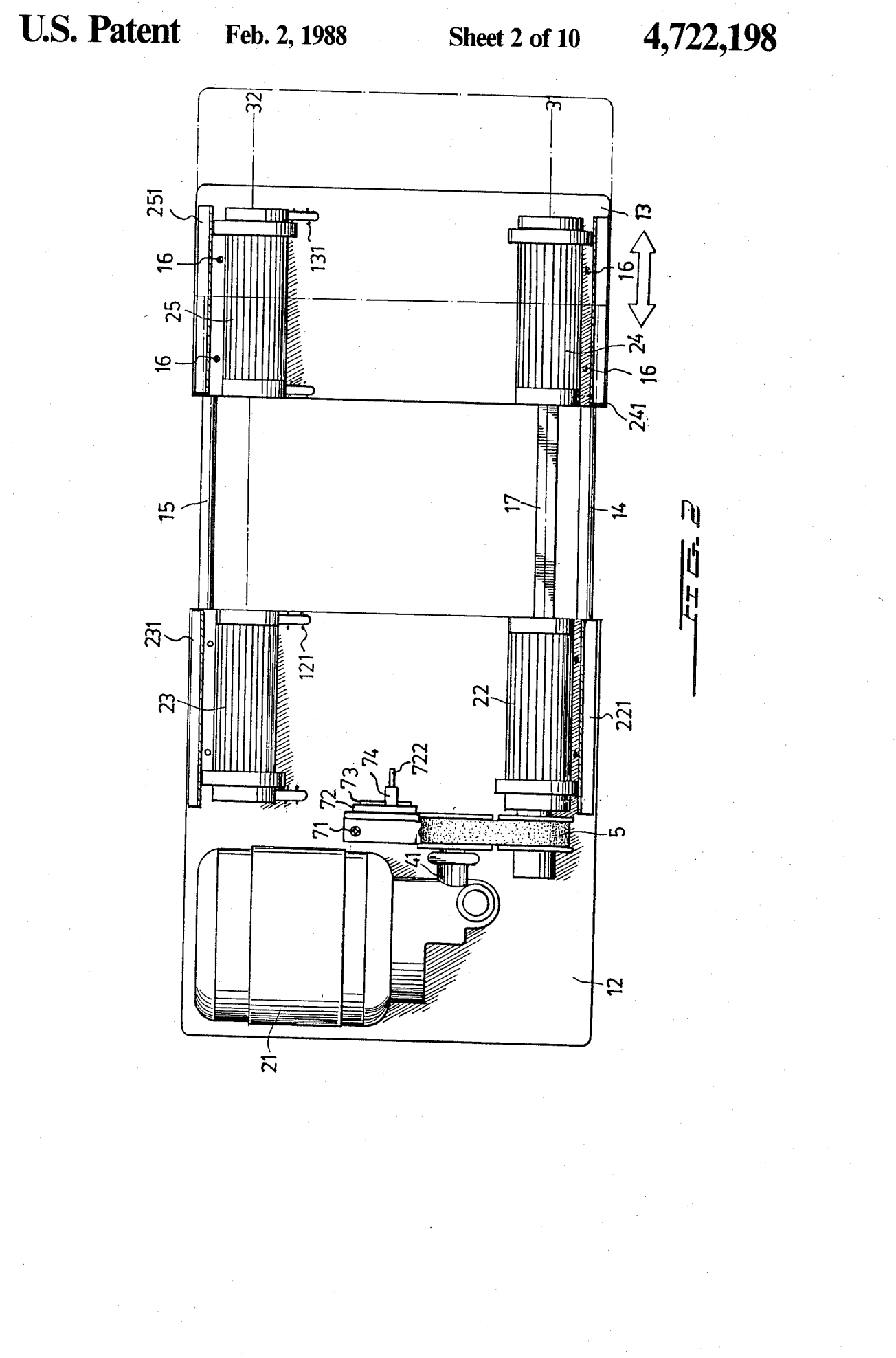

Referring to FIG. 1 and FIG. 2, it can be seen that the machine 10 comprises a platform 11, preferably comprising first and second sections 12, 13. Two rods 14, 15 are disposed under the sides of the sections 12, 13 in order to allow the first section 12 to slide on rods 14 and 15. A screw 16 is disposed through the second section 13 to contact with the rods 14 and 15, so that the position of the first section 12 is fixed. By sliding on rods 14 and 15, the distance between the first and second sections, 12 and 13, can be adjusted.

Figure 3:
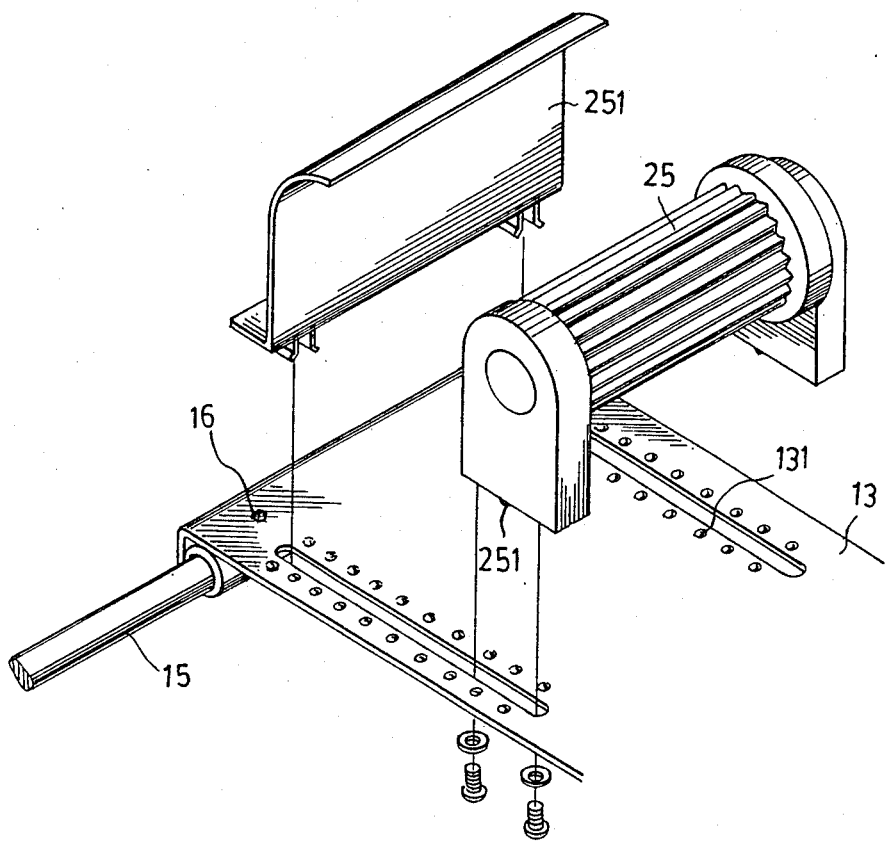
FIG. 3 is a fragmentary exploded view of the roller of the present invention.

Also referring to FIG. 1, a motor 21 is disposed on the platform 11. First, second, third, and fourth rollers 22, 23, 24 and 25, are disposed on the first and second sections 12 and 13 respectively. That is, the first and second rollers 22 and 23 are disposed on the first section 12 and the third and fourth rollers 24 and 25 are disposed on the second section 13. The first and third rollers 22 and 24 are rotatably mounted about a common first axis of rotation 31. The second and fourth rollers 23 and 25 are rotatably mounted about a common second axis of rotation 32. The first and second axis of rotation 31 and 32 are substantially parallel. The third and fourth rollers 24 and 25 are slidable on the first and second axis of rotation 31 and 32, so that the distances between the first and third rollers 22 and 24 and between the second and fourth rollers 24 and 25 can be adjusted corresponding to the adjusted distance between the first and second section 12 and 13. Referring to FIG. 3 and FIG. 2, sections 12 and 13 each has at least one series of holes 121, 131 therein, each series of holes being arranged in a column substantially perpendicular to the axes of rotation 31 and 32. The bases of the second and fourth rollers 23 and 25 have two protrusions 232 and 252 (only the fourth roller 25 and protrusions 252 are shown in FIG. 3) to be inserted into the holes 121 and 131, so that the second and fourth rollers 23 and 25 can be adjusted their position. Each roller 22, 23, 24 or 25 has a shield 221, 231, 241 or 251 (only shield 251 is shown in FIG. 3) disposed adjacently so as to avoid hurting the operator when the rollers 22, 23, 24 and 25 are rotating.

Still referring to FIG. 1, a cylindrical container 41 supported on the four rollers 22, 23, 24 and 25 has two geared belts 42 and 43 disposed on both ends to be mesh with the rollers 22, 23, 24 and 25. A belt 5 is connected between a motor 21 and the first roller 22. The first and third rollers 22 and 24 are connected with a connecting rod 17 which has a rectangular cross-section. Therefore, the first and third rollers 22 and 24 drive the container 41 to rotate. Since the distances between the rollers (both transverse and longitudinal distance) can be adjusted, the machine 10 can be used for variously sized containers 41. A further shield 18 is disposed on the first section 12 adjacent to the motor 21 to prevent the operator being hurt by the rotation of motor 21.

Figure 4:
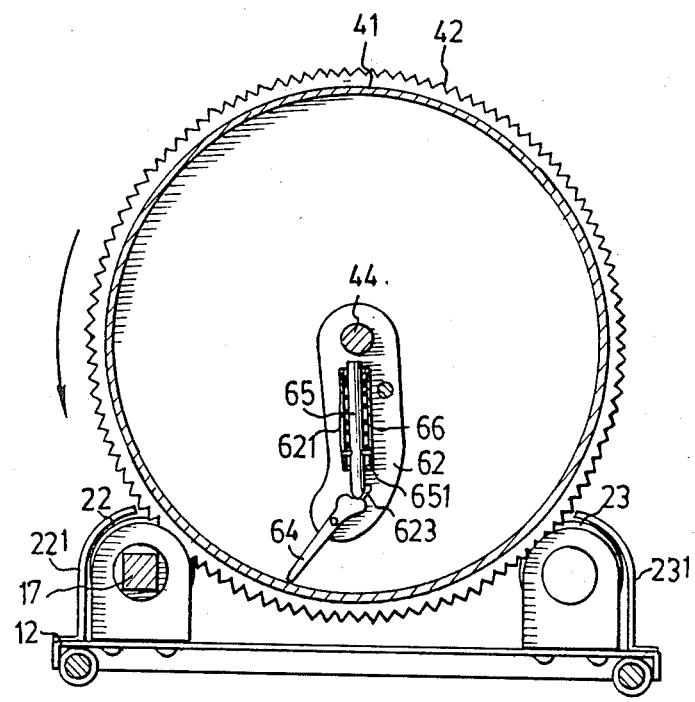
FIG. 4 is a side view of the present invention showing the scraping plate contacting with the container and the container driven by the roller.

As shown in FIGS. 4 and 5, a scraping means 61 disposed on the shaft 44 of the container 41 comprises two supporting plates 62 and 63 each of which has a hollow tube 621 or 631 welded on the inner surface. Each hollow tube 621 or 631 has two slots 622 or 632 (only slot 622 is shown in FIG. 6 on side wall). Each supporting plate 62 or 63 has a slot 623 or 633 (only slot 633 is shown in FIG. 5). The scraping means 61 further comprises a scraping plate 64 which has two protrusions 641, one on either side. The scraping plate 64 contacts with the wall of the container 41 to scrape the mix of slush or ice cream, therefore, the freezing speed of slush or ice cream is increased and the texture of slush or ice cream is comparatively fine. The protrusions 641 are inserted into slots 622 and 632 in order to be slidably engaged therein. The first hollow tube 621 has a vertical rod 65 disposed therein. The vertical rod 65 comprises two protuberances 651 to slide in the slot 622 when the vertical rod 65 is inserted in the hollow tube 62. A spring 66 is disposed around the vertical rod 65. A hollow head 624 disposed on the top of the hollow tub 62 allows the vertical rod 65 to pass through. The spring 66 is arranged between the hollow head 624 and protuberance 651 of vertical rod 65. Another hollow tube 63 also has a hollow head 634 mounted on the top, a further vertical rod 68 and a spring 69 disposed therein. The further vertical rod 68 is divided into an upper part 681 and a lower part 682. The lower part 682 comprises two protrusions 685 on its side wall to slide in the slot 632 of the hollow tube 63. The bottom end of the upper part 681 and the top end of the lower part 682 each has pin 683 or 684. The spring 69 is disposed between the pins 683 and 684. Referring to FIG. 5, the shaft 44 has a groove 45 to allow the top end of the upper part 681 of the vertical rod 68 inserted therein. Further, a connecting rod 611 is disposed between the supporting plates 62 and 63 to maintain the distance therebetween.

Referring to FIG. 1 again, it can be seen that the container 41 comprises a control rod 46 disposed on the outer part of its shaft 44. The control rod 46 is perpendicular to the axis of the container 41 and extends downwardly. Referring to FIG. 7 and 8, it can be seen that the first safety means 7 comprises a base plate 71, a control plate 72, and a flexible element 73. The base plate 71 is mounted on the first section 12. As can be seen in the FIG. 7, the base plate 71 has a plurality of holes 711 vertically aligned. The middle hole 711 is a elliptical hole. The control plate 72 also comprises a plurality of holes 721 which are vertically aligned. However the middle hole 721 is a circular hole. The top of the control plate 72 has a transverse rod 722 pivoted thereon in order to contact with the control rod 46 of the container 41. The flexible element 73 comprises two protrusions 732 and a middle hole 731 between the protrusions 732. A screw 9 is disposed through the middle holes 711, 721, and 731 of the base plate 71, control plate 72, and flexible element 73. The protrusions 732 of the flexible element 73 are inserted into the holes 711 and 721 of the base and control plate 71 and 72 (the other two holes 721 of the control plate 72 are aligned with the holes 711 of the base plate 71). Further, a guiding means 74 having three surfaces shields the transverse rod 722, so that the tranverse rod 722 can rotate clockwise but not counterclockwise.

Figure 9:
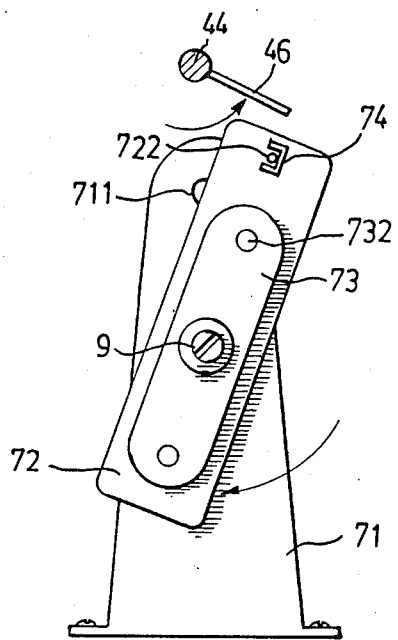
FIG. 9 shows the first safety means bent down by the rod of the shaft so that the shaft can be rotated freely.

When the slush or ice cream in the container 41 is hard enough, the scraping means 61 is pressed by the solid article of the slush or the ice cream, and the control rod 46 of the shaft 44 is forced to rotate. The transverse rod 722 is then pressed. Therefore, the protrusion 732 of the flexible element 73 is removed from the holes 711 of the base plate 71, then the control plate 72 together with the flexible element 73 can rotate. That is, as shown in FIG. 9, the transverse rod 722 does not contact with the control rod 46. Accordingly the shaft 44 of the container 41 will rotate together with the container 41. The scraping means 61 will not scrape the ice cream any more. Once the first safety means is out of order, referring to FIGS. 6A through 6C, the scraping plate 64 is forced to rotate, that is, the scraping means 61 will rotate together with the container 41, then, the scraping plate 64 will not scrape the ice cream to form the second safety means.

Figure 10:
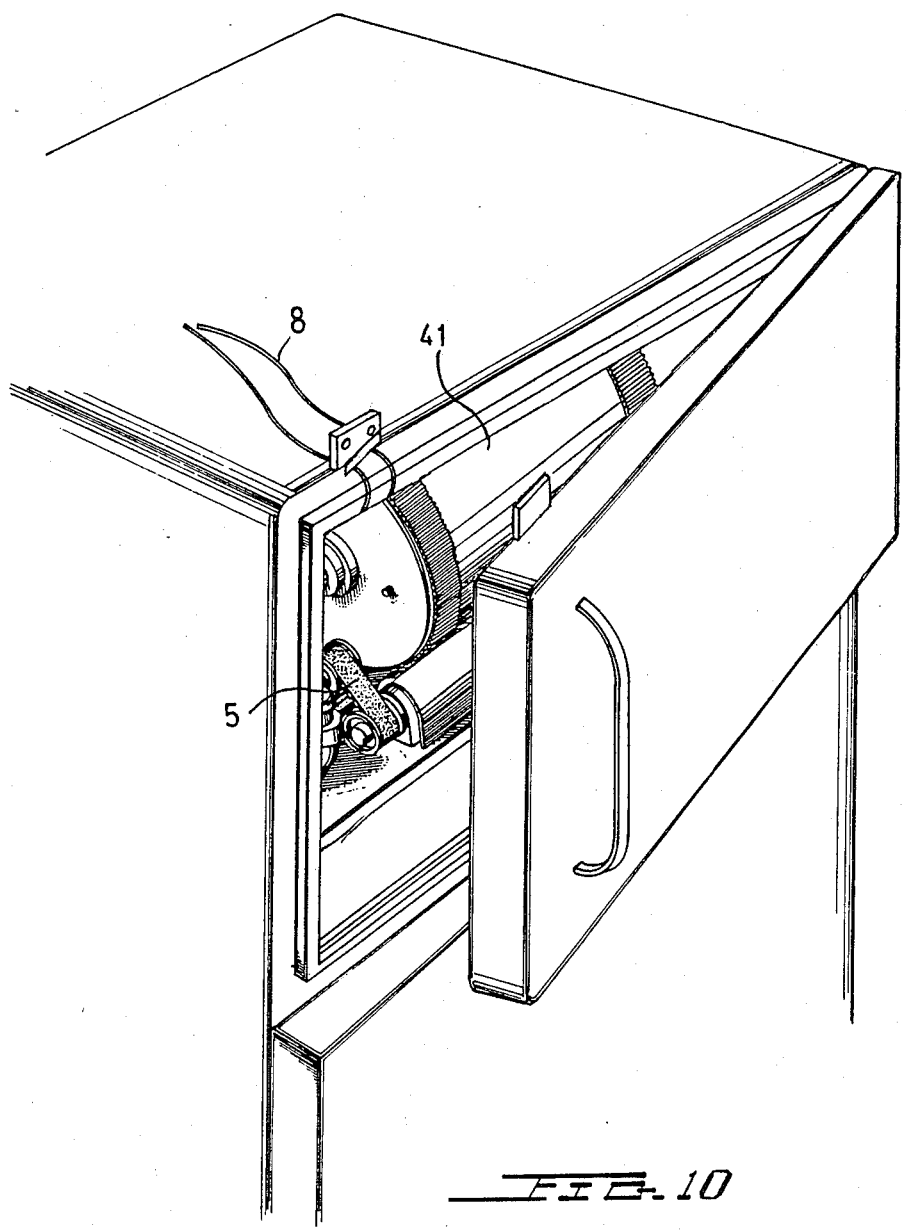
FIG. 10 is a fragmentary perspective view of the present invention showing the using condition when the slush or ice cream maker is disposed in the freezer.

Preferably the motor 21 is provided by a power cord 8 extending outside the freezer (as shown in FIG. 10). The power cord 8 is sufficiently thin (or flat) so that it can extend outside the freezer without interferring with the proper closure of the freezer door. For example, the power cord can be made by using thin and flat conductors sandwiched in a polyester film. The thickness of the cable can be as little as 0.15 mm. The resilient sealing strip of the freezer door is slightly deformed where the power cord passes out of the freezer, but otherwise maintains a good seal. Preferably power cord 8 allows electricity to flow only when a compressive force is applied to it, e.g., when the freezer door is closed on the power cord 8.

As various possible embodiments might be made of the above invention without departing from the scope of the invention, it is to be understood that all matter herein described or shown in the accompanying drawings is to be interpreted as illustrative and not in a limiting sense. Thus it will be appreciated that the drawings are exemplary of a preferred embodiment of the invention and that the scope of the invention is intended to be limited only by the scope of the appended claims.

I claim:

1. A machine suitable for placement in a freezer for making slush or ice cream in a cylindrical container, the machine comprising:
   (a) a platform;
   (b) at least four rollers, namely
      (i) first and third rollers rotatably mounted about a common first axis of rotation;

(ii) second and fourth rollers rotatably mounted about a common second axis of rotation;

the first and second axis of rotation being substantially parallel, all four rollers being mounted on the platform, the rollers being capable of supporting a cylindrical container which comprises a shaft with a groove on the inner part thereof and a control rod on the outer part thereof, such that the longitudinal axis of the container is substantially parallel to the axis of rotation of the rollers;

(c) a motor driving at least one of rollers with a belt, thereby rotating the cylindrical container;

(d) means for adjusting the axial distances between the two axes of rotation, so that the machine can be used for cylindrical containers of various lengths;

(e) means for adjusting the distances between the two axes of rotation, so that the machine can be used for cylindrical containers of various diameter;

(f) a scraping means disposed on the shaft of the container comprising two supporting plates each of which has a hollow tube welded on the inner surface and a slot at the lower end thereof, and a scraping plate having two protrusions at both side thereof so as to be slidably inserted into the slots of the supporting plates;

(g) each of the hollow tubes having two slots on side wall thereof, one of the hollow tubes having a vertical rod with two protuberances to be slidably inserted into the slots of the hollow tube and a spring mounted around the vertical rod, the other hollow tube having another vertical rod which is dividable into upper and lower parts each of which has a pin on the bottom or upper end thereof, the lower part of the vertical rod of said other hollow tube comprising two protuberances on the side wall thereof so as to be slidably inserted into the slots of the other hollow tube, a spring being disposed between the protrusions of the vertical rod, the top ends of two vertical rods being disposed against the shaft of the container; and (h) a safety means comprising a base plate with a plurality of holes, a control plate with a plurality of holes, a transverse rod, and a flexible element which has two protrusions and one hole, the holes of the control plate being aligned with the holes of the base hole, the middle holes of the base and control plates and the hole of flexaible element having a screw inserted through to be engaged together, the protrusion of the flexible element being inserted into the relative holes of the base and control plates, the transverse rod of the control plate being aligned against the control rod of the container.

2. The machine of claim 1 further comprising a plurality of shields, each shield being disposed adjacent to one of said rollers or to the motor, so that the operator is prevented from being hurt by the rollers.

* * * * *